Jan. 20, 1953 W. M. MILLER 2,625,871
LAWN EDGE TRIMMER AND CULTIVATOR
Filed Aug. 21, 1950
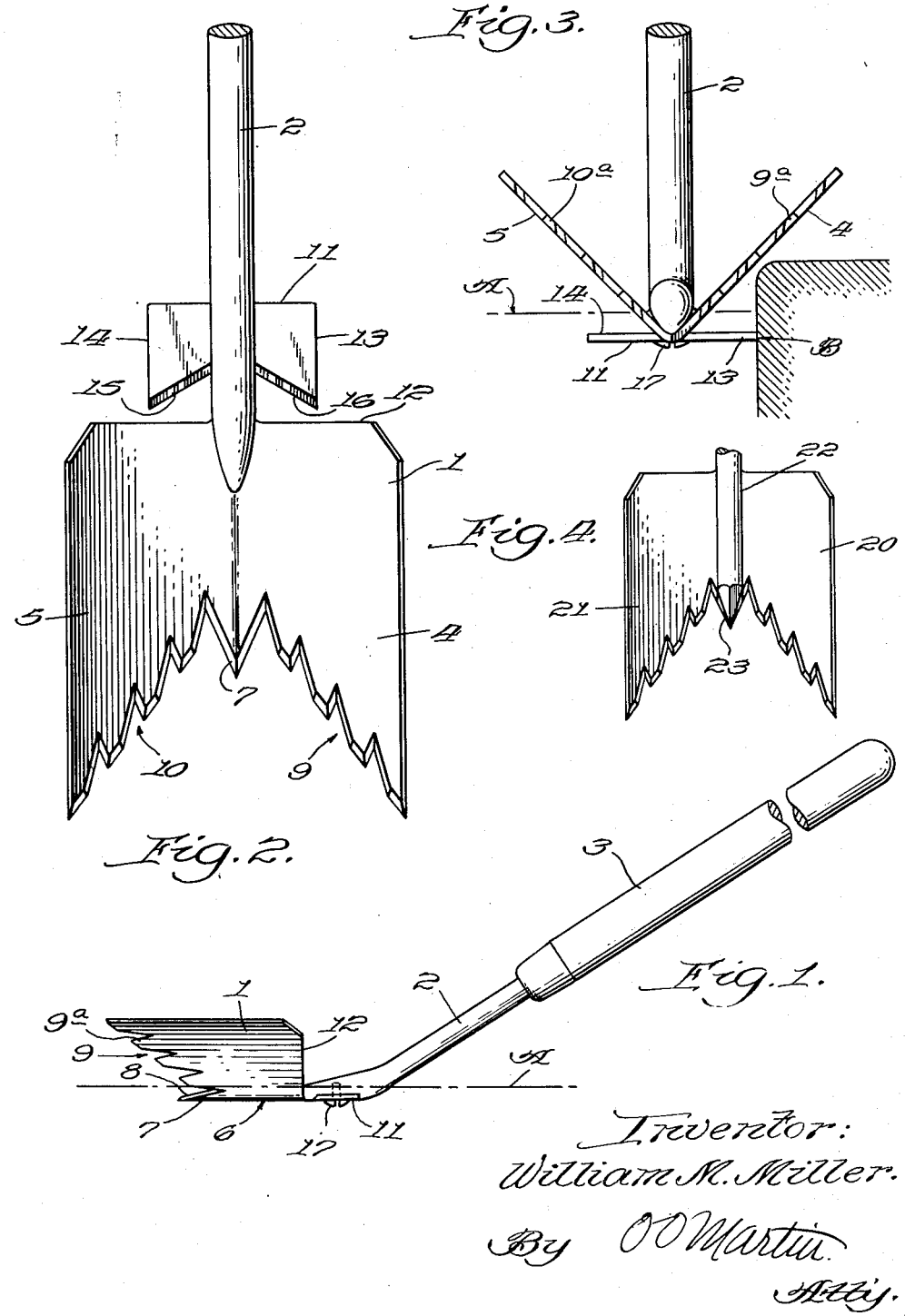
Inventor:
William M. Miller.
By O O Martin
Atty.

Patented Jan. 20, 1953

2,625,871

UNITED STATES PATENT OFFICE 2,625,871

LAWN EDGE TRIMMER AND CULTIVATOR

William M. Miller, North Hollywood, Calif.

Application August 21, 1950, Serial No. 180,523

5 Claims. (Cl. 97—227)

The present invention relates to a device for trimming and cultivating the edges of lawns close to garden paths, sidewalks and other paved surfaces.

It is the general object of the invention to provide a simple and inexpensive lawn trimming device which is convenient to operate and which, with the exertion of very little effort, will not only trim the edge of a lawn close to the curb of a path or sidewalk but which at the same time will effectively till the upper surface of the soil adjacent the curb. These and other objects of the invention, together with the many advantageous features thereof, will be better understood upon perusal of the following detailed description, particularly if reference is had to the accompanying drawings in which a preferred form of the invention is illustrated.

In the drawing:

Fig. 1 is a side view of a lawn trimming and surface cultivating device embodying the invention;

Fig. 2 is a plan view of a larger scale of the device illustrated in Fig. 1 and with a portion of the handle thereof broken away;

Fig. 3 illustrates the operating position of the device in its relation to the ground surface of the lawn and the side edge of a concrete curb; and Fig. 4 illustrates a slightly modified form of the invention.

As illustrated in the drawing, the device of the invention comprises a somewhat scoop-shaped head 1 which extends from a shank 2 and the latter is anchored in a conventional handle 3 in any suitable manner. The head, or scoop is folded along its longitudinal center line to form side walls or shares 4, 5 which, as best indicated in Fig. 3, are outwardly flared relative to the shank 2, the included angle between the axis of the shank and each of the shares being about 45 degrees.

Referring to Fig. 1, it is noticed that the front edges of the scoop are cut back to form a V-shaped recess of about 40 degrees relative to the surface A of the ground of the lawn to be trimmed. When the bottom surface 6 of the device is held substantially parallel with the ground surface, this being the position in which the device of the invention operates most efficiently, the lower portion of the scoop from the bottom of this recess is shown downwardly slanting to form a tip 7. During operation of the device, it is found that this tip will dig slightly into the surface of the ground and that the pressure of the top layer of the soil against the inclined edges 8 of the tip will tend to maintain the device in the position shown. In the inclined front edges of the head are cut teeth 9, 10, the upper edges 9ª, 10ª of which are shown downwardly inclined, substantially parallel with the upper edges of the tip 7.

When the front edges of the head are in such manner provided with series of teeth and when the edges of these teeth are beveled, as best indicated in Fig. 2, it is found that any plant growth above the surface of the soil will, during the operation of the device, be caught in these teeth and completely severed from the plants. Very little manual effort on the part of the operator is required to perform this operation. Had no teeth been cut in these front edges of the head, the result would be that the entire plant growth would be crowded against the cutting edges 8 of the tip 7 and that for this reason it would be very difficult completely to trim the plants; at least without repeating the same trimming operation over and over again many times.

It is now noticed that a plate 10 is secured to the bottom surface of the shank 2 behind and in close proximity to the rear edge 12 of the trimmer scoop. This plate is mounted parallel with and substantially in continued alignment with the bottom surface 6 of the trimmer and it extends laterally a distance from the shank to form wings 13, 14 which, when the device is in the operative position indicated in Fig. 3, contacts the side edge B of the concrete curb, against which it is held during the operation of the device. When operated in this manner and when this plate takes the position a short distance below the ground surface A, as indicated in the drawing, it is found that a strip of ground corresponding to the width of the plate will be thoroughly cultivated during the trimming operation, leaving no plant growth projecting above the surface of the soil along this strip.

It is furthermore important to note that this plate will tend to maintain the outer surface of the share 5 away from the edge of the concrete and should this surface come into contact with the concrete it will be instantly felt by the operator who, by slight upward tilting movement of the trimmer, will withdraw the share from the concrete and so will eliminate unnecessary wear on the surface thereof. From this short description it is seen that the plate 10, which may be termed the heel of the trimmer, performs a very important double function. The front edges 15, 16 of the wings 13, 14 should also be beveled, as indicated in Fig. 2, in order to provide sharp cutting edges thereon. Since the side edges of the wings 13, 14 will be most likely to contact the edge of the curb during the operation of the device and because these side edges are relatively short, the wear on these side edges may be considerable. It may, for this reason, be found preferable detachably to mount the heel on the shank of the trimmer. Illustrative of such mounting, I have in Fig. 1 shown a screw 17 threaded into a recess or perforation of the shank to clamp the heel plate in position thereon.

In order to lower the manufacturing cost of the device, it may be found preferable for the one-piece, scoop-shaped trimmer head to substitute separate share plates 20, 21, substantially as indicated in Fig. 4. When such separate shares are used, it becomes necessary to extend the shank 22 to the front edge of the trimmer in order to provide sufficient anchoring surface for the share plates. The latter may then be welded or riveted in position thereon. In this case, it may be found more convenient to shape the forward end of the shank to form a tip 23 which will take the place of the tip 7 originally provided. Other modifications may be embodied within the scope of the claims hereto appended.

I claim:

1. A lawn trimmer comprising a scoop-shaped head mounted on the end of a handle at an acute angle relative to the longitudinal axis thereof, said head consisting of plates symmetrically extending outwardly and upwardly from the center line thereof to form the shares of the trimmer, the included angle being about 90°, the front edges of the shares being cut back downwardly and rearwardly from the upper front corners thereof on an angle of about 30° a distance nearly to the bottom of the trimmer, the front edges of the shares being forwardly and downwardly tapered from the corner end of said cut-back to form a pointed tip, and a heel plate on the bottom surface of the handle directly behind and in continued alignment with the bottom of the trimmer.

2. A lawn trimmer comprising a scoop-shaped head mounted on the end of a handle at an acute angle relative to the longitudinal axis thereof, said head consisting of plates symmetrically extending outwardly and upwardly from the center line thereof to form the shares of the trimmer, the included angle being about 90°, the front edges of the shares being cut back downwardly and rearwardly from the upper front corners thereof on an angle of about 30° a distance nearly to the bottom of the trimmer, the front edges of the shares being forwardly and downwardly tapered from the corner end of said cut-back to form a pointed tip, and a heel plate on the bottom surface of the handle directly behind and in continued alignment with the bottom of the trimmer, the front edges of said plate being downwardly tapered to provide therealong sharp cutting edges.

3. A lawn trimmer comprising, a scoop-shaped head, a shank rearwardly extending from said head a short distance and then upwardly directed at an acute angle relative thereto, the head consisting of two plates symmetrically extending outwardly and upwardly from the center line of the head and shank at an included angle of about 90°, the front edges of the shares being cut back on an angle of about 30° from the upper front corners thereof a distance nearly to the bottom of the trimmer, the portions of the share edges below said cut being forwardly and downwardly tapered to form a pointed tip, and a heel plate on the bottom surface of the shank directly behind and in continued alignment with the bottom of the trimmer.

4. A lawn trimmer comprising, a scoop-shaped head, a shank rearwardly extending from said head a short distance and then upwardly directed at an acute angle relative thereto, the head consisting of two plates symmetrically extending outwardly and upwardly from the center line of the head and shank at an included angle of about 90°, the front edges of the shares being cut back on an angle of about 30° from the upper front corners thereof a distance nearly to the bottom of the trimmer, the portions of the front edges of the shares below said cut being downwardly and forwardly tapered to form a pointed tip, there being formed in the rearwardly directed front edges of the shares a series of V-shaped grooves, and a heel plate on the bottom surface of the shank directly behind and in continued alignment with the bottom of the trimmer, the front edges of the shares, of the tip thereof and of the said heel plate being all downwardly tapered to form sharp cutting edges.

5. A lawn trimmer comprising a scoop-shaped head mounted on the end of a handle at an acute angle relative to the longitudinal axis thereof, said head consisting of plates symmetrically extending outwardly and upwardly from the center line thereof to form the shares of the trimmer, the front edges of the shares being cut back downwardly and rearwardly from the upper front corners thereof a distance nearly to the bottom of the trimmer, the front edges of the shares being forwardly and downwardly tapered from the lower end of said cut-back to form a pointed tip, and a heel plate mounted on the bottom of the handle directly behind and in continued alignment with the bottom of the trimmer.

WILLIAM M. MILLER.

REFERENCES CITED

The following references are of record in the file of this patent:

UNITED STATES PATENTS

| Number | Name | Date |
|---|---|---|
| 709,976 | Fernstrom | Sept. 30, 1902 |
| 884,416 | Poindexter | Apr. 14, 1908 |
| 1,211,655 | Adams et al. | Jan. 9, 1917 |
| 2,288,374 | Steele | June 30, 1942 |